W. J. NEIDL.
SPIRIT LEVEL AND PLUMB.
APPLICATION FILED APR. 12, 1919.
1,362,813.
Patented Dec. 21, 1920.
2 SHEETS—SHEET 1.
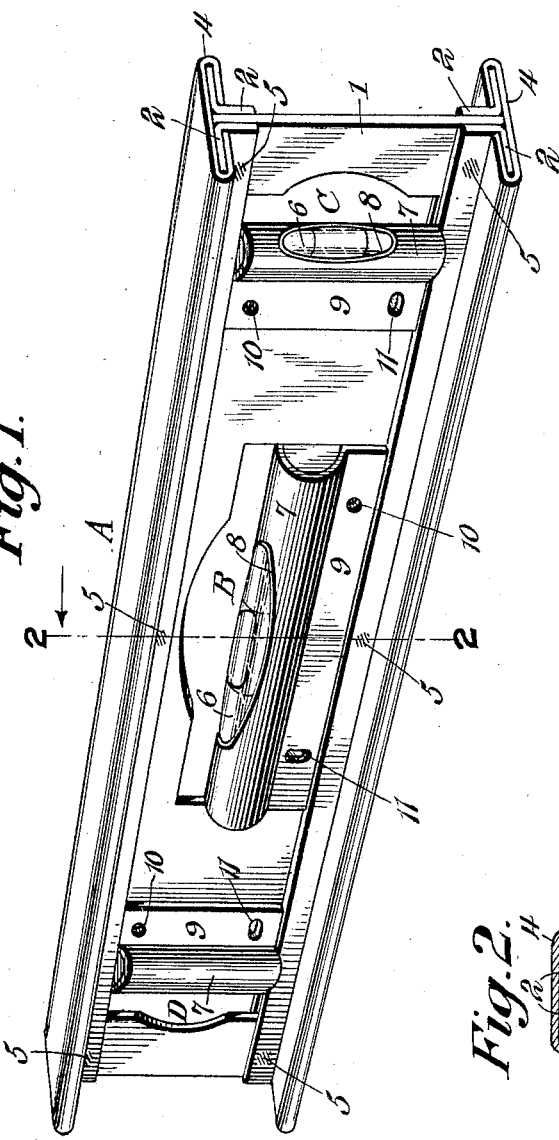
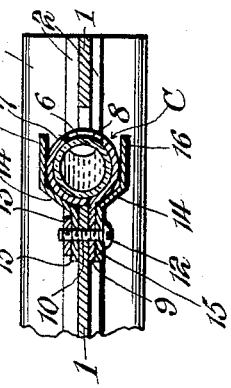
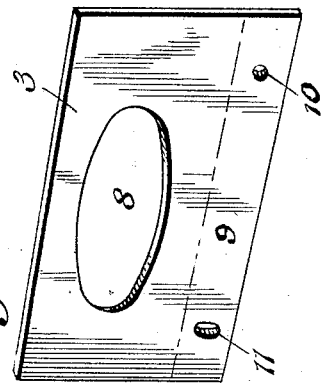
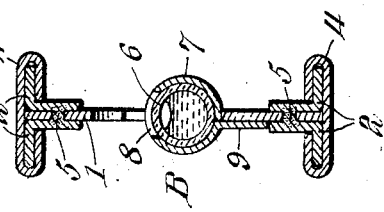
WITNESSES
William J. Neidl, INVENTOR
BY
ATTORNEY W. J. NEIDL.
SPIRIT LEVEL AND PLUMB.
APPLICATION FILED APR. 12, 1919.
1,362,813.
Patented Dec. 21, 1920.
2 SHEETS—SHEET 2.
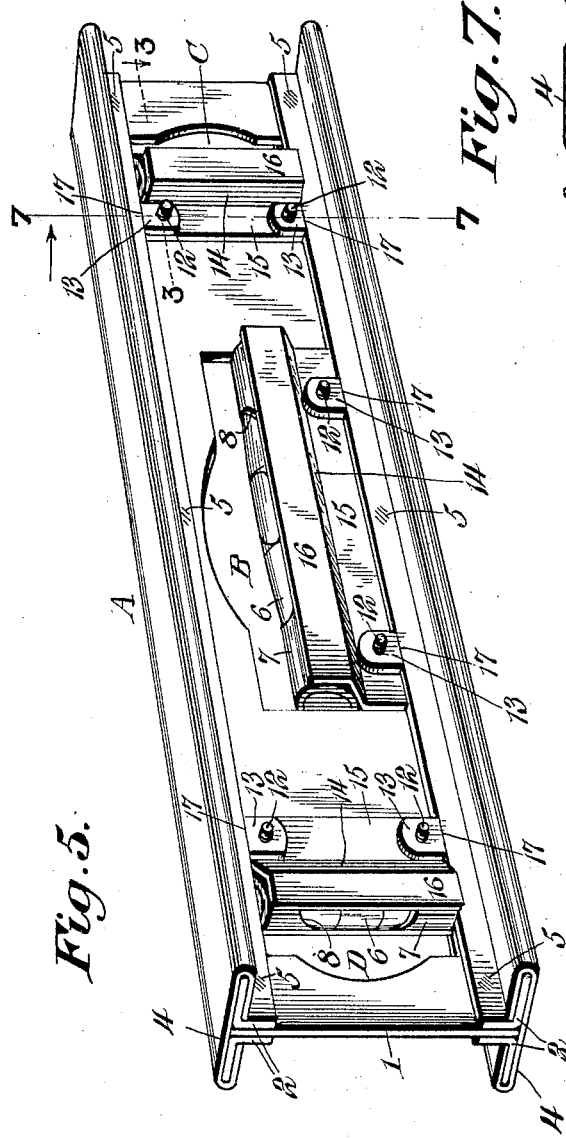
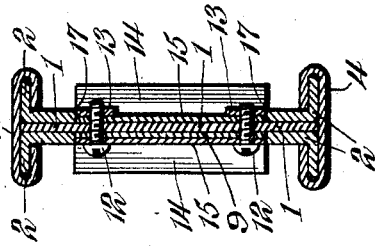
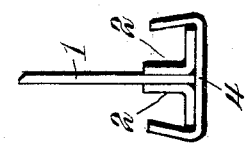
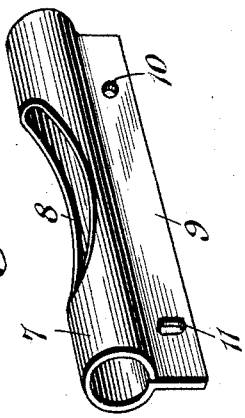
WITNESSES
William J. Neidl, INVENTOR
BY
ATTORNEY

UNITED STATES PATENT OFFICE.

WILLIAM JOSEP NEIDL, OF NEW BRITAIN, CONNECTICUT.

SPIRIT-LEVEL AND PLUMB.

1,362,813. Specification of Letters Patent. Patented Dec. 21, 1920.

Original application filed December 24, 1919, Serial No. 347,055. Divided and this application filed April 12, 1919. Serial No. 289,538.

*To all whom it may concern:*

Be it known that I, WILLIAM J. NEIDL, a citizen of the United States, residing at New Britain, in the county of Hartford and State of Connecticut, have invented a new and useful Spirit-Level and Plumb, of which the following is a specification.

This invention relates to spirit levels and plumbs.

The object of the invention is to improve the construction of the bubble glass holders by the provisions of means for protecting the glass from breakage, and by certain means of adjustment and mounting of said holders, whereby the manufacture of the same is facilitated, the use of the level is made more convenient and satisfactory to the artisan, and the life of the tool is prolonged.

The invention consists in certain novel features of construction and combination of parts hereinafter set forth in the description and particularly pointed out in the claims, it being understood that while the drawing shows the preferred embodiment of the invention, that changes in the form, size, proportion and minor details of construction may be made without departing from the spirit or scope of the invention as defined in the appended claims.

In the drawing—

Figure 1 is a perspective view of the spirit level and plumb containing some of the features of my invention, the securing means for the bubble glass holders being omitted, as well as the protecting devices therefor.

Fig. 2 is a vertical section on the line 2—2 of Fig. 1;

Fig. 3 is a horizontal section on the line 3—3 of Fig. 5;

Fig. 4 is a detail perspective view of the blank form which the bubble glass inclosing case or cylinder is formed;

Fig. 5 is a detail perspective view of the completed spirit level and plumb, with all the fixtures constituting my invention;

Fig. 6 is a detail perspective view of the inclosing case or cylinder forming the bubble glass holder;

Fig. 7 is a vertical section on the line 7—7 of Fig. 5;

Fig. 8 is a detail view showing how the flanges of the I-beam or stock are formed.

Like reference characters designate corresponding parts in the several figures of the drawing.

The spirit level and plumb comprises generally a body A, a centrally disposed level glass B, and two plumb glasses C, D, at the ends of the body. In the following description, the terms "top" and "bottom" will be used in referring to the flanged longitudinal edges of the body, the bottom being that edge upon which the body rests when the bubble of the central level glass faces upwardly.

The body of the level, which is often designated as the stock or beam, is made I-shaped in cross-section, and will be referred to hereinafter as the "I-beam." It is made of cold, rolled steel throughout. I have selected this material because of its lightness and tensile strength, in this respect being superior to wood because of its durability, and to cast iron owing to its less weight and freedom from breakage.

The stock or beam comprises a web 1, of suitable length and width to accord with the size of the tool being constructed. Appropriately-sized openings are cut in the web to provide for the central level glass B, and the end plumb glasses C, D. Applied to each side face at the longitudinal edges of the web are two pairs of reinforcing plates, 2, 2, coextensive in length with the web, of right angular shape in cross-section, which angular plates when combined with a covering plate 4, constitute the top and bottom flanges of the stock or beam. The reinforcing plates are placed with their vertical flanges flat against the opposite faces of the web, and are then spot-welded to the web, as indicated at 5, thereby uniting the angular plates 2 to the web. The horizontal flanges extend outwardly from the web, and have their outer faces substantially flush with the longitudinal edges of the web.

The covering plates 4, which are coextensive in length with the web and angular plates, and which form the outer facing plates for the flanged edges of the body, each extend from the vertical flange of one reinforcing plate along the inner side of the horizontal flange thereof, then around the outer edge of said horizontal flange; then over the outer face of said horizontal flange, across the outer longitudinal edge of the web to and across the angular plate on the other side, the edge of which it embraces in a manner similar to the first-mentioned angular plate, and is then turned inwardly and along the inner side of the horizontal flange of the second-named angular plate terminating at the vertical flange thereof, the covering and facing plates fitting the faces and edges of the angular plates tightly and snugly.

In Fig. 8 of the drawings, I have shown how the covering plate is bent around the faces and edges of the horizontal flanges of the two angular plates, it being understood, of course, that bending of the covering plates is done by appropriate machinery.

When the covering plates are applied in position, they combine with the two angular plates and the web to form the flanges of the I-beam, which are as rigid and serviceable as though they were made out of cast-iron, but having none of the objections of cast-iron, since the structure of the flanges made in accordance with my invention may be considered practically unbreakable. So perfect is the union between the several elements; namely, the covering plates, web and flanges, that except when viewed at the ends, the beam or stock has the appearance of being made of one piece. I regard this as one of the essential features of my invention.

The construction and mounting of the central level glass B, and the two plumb glasses, C, D, are essentially the same, and the description of one will comprehend the others. Referring first to the central level glass B, the bubble glass 6 is of the ordinary cylindrical form, as shown in Fig. 2. The holder 7 for the same is formed of a rectangular plate 3, shown in Fig. 4, having an elliptical-shaped opening 8, which allows for the display and reading of the bubble therethrough. Said plate is bent into cylindrical form of a size to snugly embrace the bubble glass, one edge of the plate abutting against the face of the plate at a point remote from the other edge, (indicated by a dotted line in Fig. 4) the remaining portion of the plate being then bent outwardly at an angle to form a longitudinal attaching flange or fin 9, by means of which the bubble glass holder is mounted in position. Said flange is provided at one end with a round opening 10, and at the other end with a slot 11 for the passage of screw bolts 12, having nuts 13 at one end, said bolts and nuts being used to fasten the fin or flange 9 of the bubble glass holder 7 along one side edge of the opening cut in the web. The slot 11 provides for the adjustment of the bubble glass holder to maintain the bubble in its properly set position.

Fig. 1 of the drawings shows the central level glass and the end plumb glasses mounted in position without bolts or nuts, while Fig. 5 shows the completed structure ready for use. Though Fig. 3 is a section through one of the end plumb glasses, it may also be taken as a section through the central level glass, for the construction is the same in all three instances. Mounted on each of the bolts 12 and on opposite sides of the bubble glass holder, is a pair of protecting plates 14 each of which, as shown, consists of an attaching portion 15 and an offset protecting portion 16. These two plates are coextensive in length with the bubble glass holder and extend around the bottom and along the sides thereof to a point nearly to the top, as shown clearly in Fig. 5, the purpose being to protect the bubble glass holder and the inclosed bubble glass from injury, and yet at the same time not interfere with the ready reading thereof. In other words, these protecting plates, while performing the function of protectors for the bubble glass, do not obscure the view to the bubble.

It will be noted from Fig. 1, that the thickness of the fin or flange 9 of the bubble glass holder is somewhat less than the vertical flange of the adjacent angle plate 2. When the protecting plates are fitted on each side of the bubble glass holder, the longitudinal edges of the attaching portions 15 of said plates should abut against the upper edges of the flanges 2. The nuts 13 have one flat or straight side so that when applied in position, the flat sides of the nuts are brought into contact with the edges of the angle plates 2, and are held from turning. To permit this, the screw heads of the bolts 12 are formed with nicks so as to allow them to be turned by a screw driver while the nuts are held in position. By this arrangement, since the nuts cannot loosen, there is no danger of the parts becoming detached and lost.

The plumb glasses C, D, which, as stated, are of substantially the same construction as the central level glass B, need not be specifically described. They embody the same bubble glass holder 7, with attaching flange or fin 9, the protecting plates 14, and the bolts 12 and nuts 13, with this difference, however, that as shown in Fig. 5, the protecting plates 14 of the plumb glasses fit at the ends between the longitudinal edges of the upper and lower angular plates 2.

It will be observed that the openings cut in the web to receive the plumb and level glasses are of such length relative to the bubble glass holders that the latter abut at their ends against the end walls of said openings, thus being held from endwise movement.

By the construction herein described, a level and plumb is provided, which is superior in points of simplicity, durability and inexpensiveness over the devices now upon the market. Because of the provision made for the protection of the bubble glass, and the unbreakable character of the beam, the tool should last a lifetime, and yet the price of the tool is no greater than the less desirable tools in use.

No claim is made in this application to the construction of the level stock or beam, as this is made the subject matter of the copending application filed December 24, 1919, Serial Number 347,055.

What is claimed is—

1. In a spirit level, a bubble glass, a holder for said glass formed of a rectangular plate having an opening through which the glass is exposed, and bent into cylindrical form to embrace the glass, one edge of the plate being bent outwardly, after forming the cylindrical casing, to provide an attaching fin or flange by means of which the holder is mounted in position.

2. In combination with a beam or body, a bubble glass, a holder for said glass, means for securing said holder to said beam or body, and protecting plates arranged at each side of said holder and secured in place by the same means which fasten the holder in position.

3. In combination with a beam or body, a bubble glass, a holder for said glass secured to the beam, and protecting plates also secured to the beam or body at each side, and having an offset protecting portion to fit along each side of said holder, leaving the reading face of the glass exposed.

4. In combination with a beam or body, a bubble glass, a holder for said glass secured to the beam or body, a longitudinal attaching flange provided on said holder, means for attaching said flange to the beam or body, and protecting plates arranged along each side of the bubble glass holder for protecting the glass, said plates being secured in position by the same means which fasten the holder in place.

5. In combination with a beam or body, a bubble glass, a holder for said glass mounted on said beam or body, flanges provided on said beam or body, and means for securing the bubble glass holder in place, consisting of bolts having screw heads at one end, and nuts with flat sides at the other, the flat sides of the nuts contacting with the longitudinal edge of one of the flanges to prevent the nuts from turning.

6. In combination with a beam or body having an opening, a bubble glass, a holder for said glass secured to the beam in said opening, and protecting plates arranged at each side of said holder and consisting of an attaching portion and an offset protecting portion, the latter being arranged along each side of said holder, and bolts and nuts for fastening both the bubble glass holder and protecting plates to the beam or body.

7. In combination with a beam or body, a bubble glass, a holder for said glass secured to the beam or body, and protecting plates arranged at each side of the holder and consisting of an attaching portion and an offset protecting portion, the latter being arranged along each side of said holder, and means for fastening the protecting plates to the beam or body.

In testimony that I claim the foregoing as my own I have hereto affixed my signature in the presence of two witnesses.

WILLIAM JOSEP NEIDL.

Witnesses:
JULIUS F. PRESCHER,
FLOSSIE K. CHRISTESEN.